US008241300B2

(12) United States Patent
Lynd et al.

(10) Patent No.: US 8,241,300 B2
(45) Date of Patent: Aug. 14, 2012

(54) ANIMAL TAG APPLICATOR AND TAGS THEREFOR

(75) Inventors: Malcolm Norman Lynd, Auckland (NZ); Roy Victor Bladen, Auckland (NZ)

(73) Assignee: Tagam Limited (NZ)

( * ) Notice: Subject to any disclaimer, the term of this patent is extended or adjusted under 35 U.S.C. 154(b) by 502 days.

(21) Appl. No.: 12/518,878

(22) PCT Filed: Dec. 13, 2007

(86) PCT No.: PCT/NZ2007/000364
§ 371 (c)(1),
(2), (4) Date: Jun. 11, 2009

(87) PCT Pub. No.: WO2008/075974
PCT Pub. Date: Jun. 26, 2008

(65) Prior Publication Data
US 2010/0030226 A1 Feb. 4, 2010

(30) Foreign Application Priority Data

Dec. 20, 2006 (NZ) ........................................ 552306

(51) Int. Cl.
*G09F 3/16* (2006.01)
*A61B 17/00* (2006.01)

(52) U.S. Cl. ........................... 606/117; 40/301; 606/143

(58) Field of Classification Search .................. 606/116, 606/117, 142, 143, 151, 157, 158; 40/300–302; 30/363; 227/21, 47, 74, 86, 91, 120
See application file for complete search history.

(56) References Cited

U.S. PATENT DOCUMENTS

| 4,796,627 | A | * | 1/1989 | Tucker ........................... 606/143 |
| 5,032,127 | A | * | 7/1991 | Frazee et al. ................... 606/143 |
| 5,234,440 | A | * | 8/1993 | Cohr .............................. 606/117 |
| 6,053,926 | A | | 4/2000 | Luehrs |
| 6,231,579 | B1 | * | 5/2001 | Castro Netto ................. 606/116 |
| 2004/0092954 | A1 | | 5/2004 | Eadie |

FOREIGN PATENT DOCUMENTS

| EP | 002619 | 3/1981 |
| EP | 0482902 | 4/1992 |
| GB | 2055670 | 3/1981 |
| GB | 2276112 | 3/1993 |
| RU | 2265324 | 12/2005 |
| SU | 1069738 | 1/1984 |
| WO | WO9822028 | 5/1998 |
| WO | WO 02/23980 A2 | 3/2002 |
| WO | WO 02/23980 A3 | 3/2002 |
| WO | WO2008075974 | 6/2008 |

* cited by examiner

*Primary Examiner* — Kathleen Sonnett
(74) *Attorney, Agent, or Firm* — Hendricks, Slavin & Holmes LLP

(57) ABSTRACT

An animal tag applicator (1) has handles (2) and (3) pivotally connected together and extending to respective jaws (6) and (7) for dispensing an ear tag (10) to be engaged about an animal's ear (39). The tags (10) are in the form of an elongate, longitudinally connected, strip which can be accommodated within the hollow handle (2). A slider (17) has a pusher (18) engaged with the front-most tag (10A) to move it into the dispensing position where its male portion is engaged by the top jaw (7) and a cutting means (31) severs the connection between the front-most tag (10A) and the immediately following tag. A releasable stop member (42) engages the front-most tag (10A) before it is dispensed. A lost motion slot (43) enables the cutting means (31) to be raised before the pusher (18) engages with the next tag (10) to move it into the dispensing position.

11 Claims, 16 Drawing Sheets

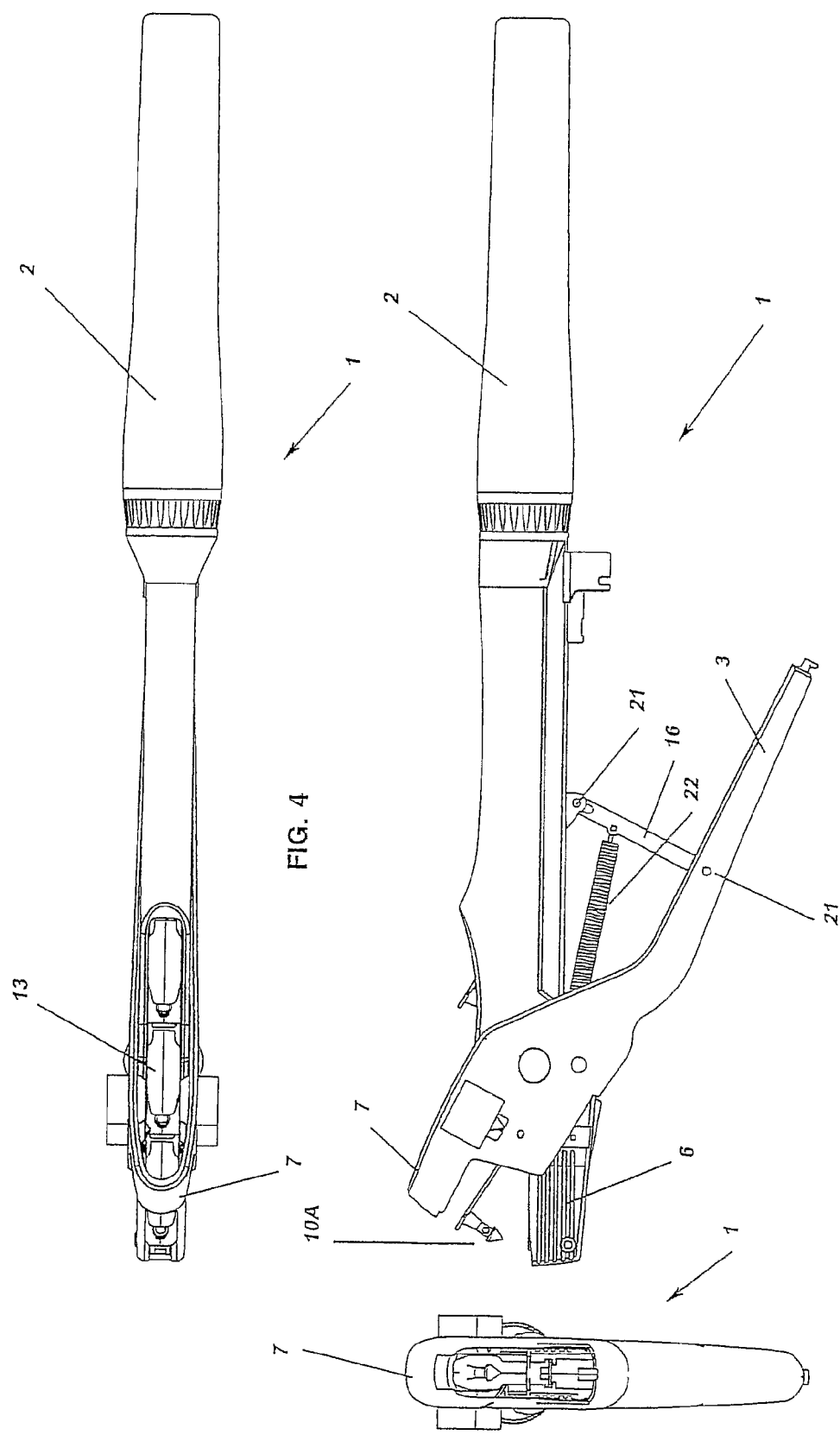

ANIMAL TAG APPLICATOR AND TAGS THEREFOR

CROSS REFERENCE TO RELATED APPLICATIONS

This application is a National Stage of International Application No. PCT/NZ2007/000364, filed Dec. 13, 2007.

FIELD OF THE INVENTION

This invention relates to improvements in and relating to animal tag applicators and/or tags therefor.

More particularly but not exclusively the present invention relates to applicators and/or tags which are suitable for farm animals such as sheep.

BACKGROUND TO THE INVENTION

To the present time many tag applicators are able to be used solely for the application of a single tag to an animal, typically to its ear. Such applicators require the loading of discrete tags ready for each application with the consequential time and effort that this involves.

Other applicators however, have proposed the use of a strip of tags which can be loaded into an applicator so that tags can be sequentially dispensed from the applicator.

In U.S. Pat. No. 5,234,440, (Cohr), for example, a strip of tags is loaded into a magazine positioned alongside the applicator body. To dispense an individual tag, the operation of the applicator results in the front tag in the magazine being moved into the applicator body where a blade of a slider will sever the leading tag from the tag strip in the magazine and a tag advance mechanism will move the now separated tag to the front of the applicator where it can be secured to the animal. Typically such a side loading operation and the early separation of the tag from the strip has been found to provide various disadvantages, especially in the difficulty and unreliability of its operation.

In another applicator, as described in New Zealand patent 524953, (Eadie), this again provides a flat strip of tags which is located transverse of an applicator body. The tags are then fed individually and sequentially into the applicator body by a tooth wheel. This design results in the first two tags of the strip being unusable in each case and the side-loading operation also presents difficulties.

OBJECT OF THE INVENTION

It is an object of at least preferred embodiments of the invention to provide an animal tag applicator and/or strip of tags which will at least obviate difficulties in previous applicators and/or strip of tags, or which at least will provide the public with a useful choice.

Further objects of the invention will become apparent from the following description.

BRIEF SUMMARY OF THE INVENTION

According to one aspect of the present invention there is provided an animal tag applicator, including an applicator body adapted to receive therein a strip of longitudinally connected tags, transporting means provided for the body and adapted in use to engage with the said strip of tags, so that the strip is moved substantially longitudinally relative to the applicator body to position a front-most tag of the strip at a dispensing position, said applicator further including a dispensing means adapted to engage, in use, with said front-most tag so that it is separated from the next adjacent tag in the strip at said dispensing position to be secured about part of an animal, said transporting means being adapted to then be re-engageable with said strip to move the next front-most tag to said dispensing position.

Preferably, the transporting means is adapted to pull the strip longitudinally relative to the applicator body.

Preferably, the transporting means is adapted to engage a portion of the front-most tag in pulling the strip.

Preferably said applicator body is adapted to receive said strip of tags in which each tag of said strip includes a male portion flexibly interconnected with and facing towards, a female portion, the engagement of the dispensing means with the front-most tag resulting in the engagement of the male portion with the female portion and the separation of the front-most tag from the next adjacent tag.

According to a further aspect of the present invention a strip of tags for use in an applicator as defined in any one of the four paragraphs immediately above includes each tag having a male portion and a female portion, a connecting portion longitudinally connecting adjacent tags together to form said strip, said strip being adapted to engage in use with a transporting means so that the strip can be moved substantially longitudinally relative to an applicator body towards a dispensing position, said tags being adapted to be selectively engagable by a dispensing means whereby a front-most tag of the strip can be separated from its next adjacent tag so that said front-most tag can be secured about part of an animal.

Preferably said strip of tags has the male portion of each tag of said strip facing towards a respective said female portion.

According to a further aspect of the present invention, there is provided an animal tag applicator and/or an animal tag strip substantially as herein described with reference to the accompanying drawings.

Further aspects of this invention which should be considered in all its novel aspects will become apparent from the following description by way of example of possible embodiments.

BRIEF DESCRIPTION OF THE DRAWINGS

FIGS. 3, 4, 5: Show respectively side, plan and end views of the applicator of FIG. 2;

BRIEF DESCRIPTION OF POSSIBLE EMBODIMENTS

Figure 1:
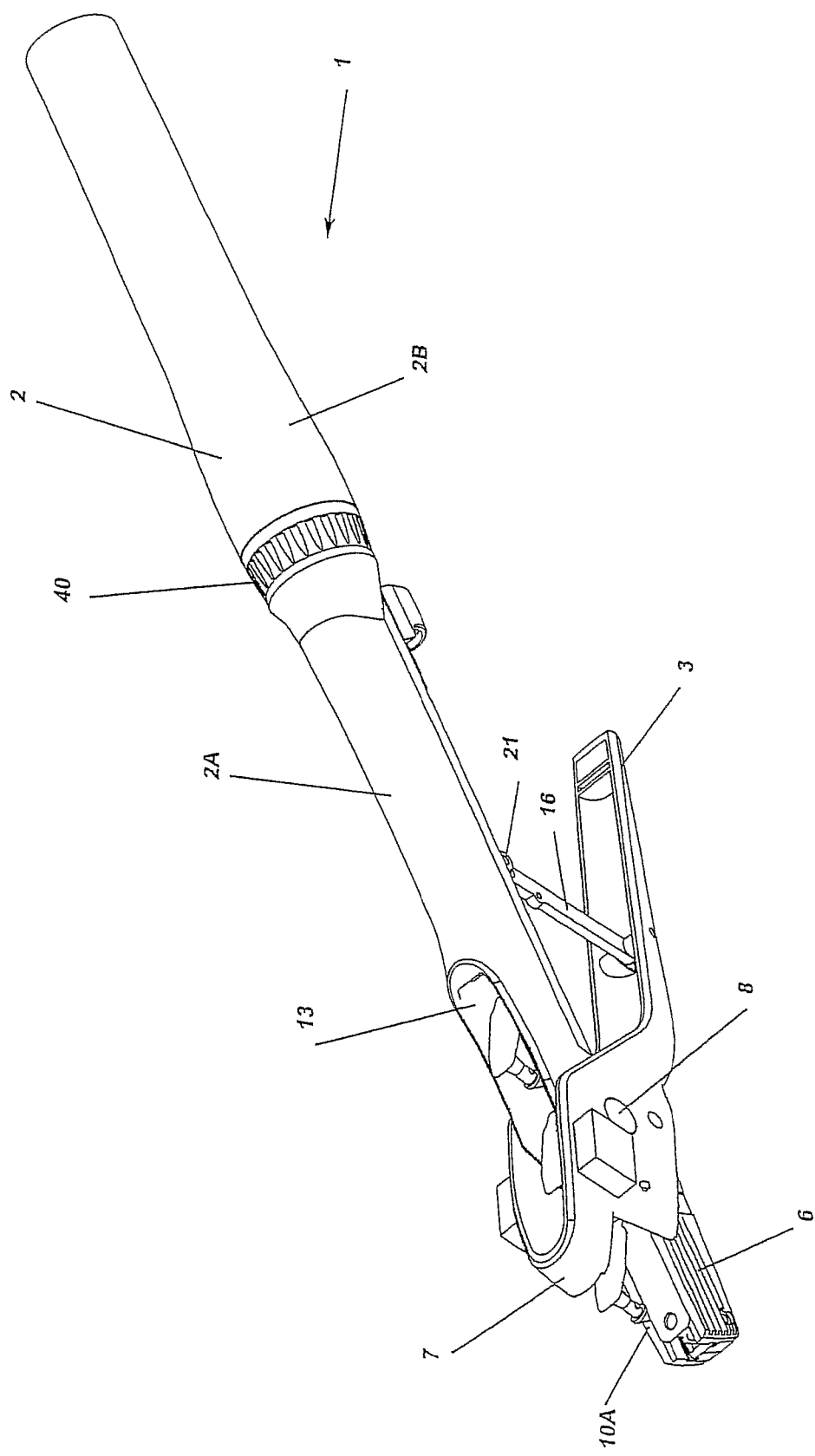
FIG. 1: Shows very diagrammatically an ear tag applicator loaded with an ear tag strip and according to one possible embodiment of the invention.
Figure 2:
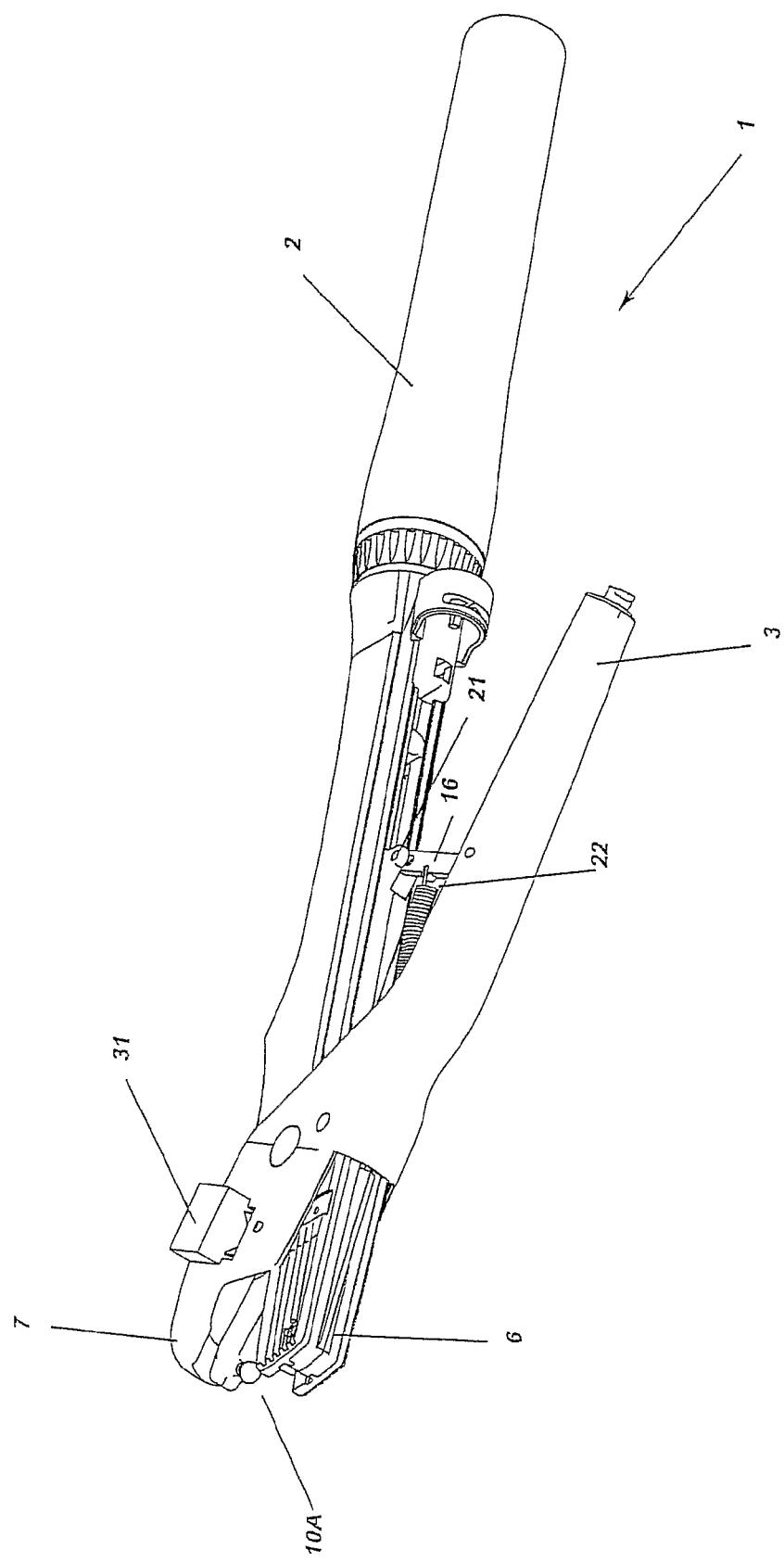
FIG. 2: Shows an underside perspective view of the ear tag applicator of FIG. 1.

Referring to the accompanying drawings, an applicator according to one possible embodiment of the invention is referenced generally by arrow 1.

The applicator 1 may be manufactured from any suitable material or materials, such as metal and plastics. It is shown having a first handle portion 2 leading to a lower front jaw 6. The handle portion 2 provides an applicator body portion and is adapted to accommodate at least part of an elongate strip of tags 10. The handle 2 may as shown be in two parts 2A, 2B which may be screwed together at connection portion 40. It is envisaged that in some embodiments, for a shorter tag strip, the rear part of the handle 2B could be detached. A lower handle 3 is shown associated with a front upper jaw 7. The handles 2, 3 are shown pivoted together at 8.

Figure 13:
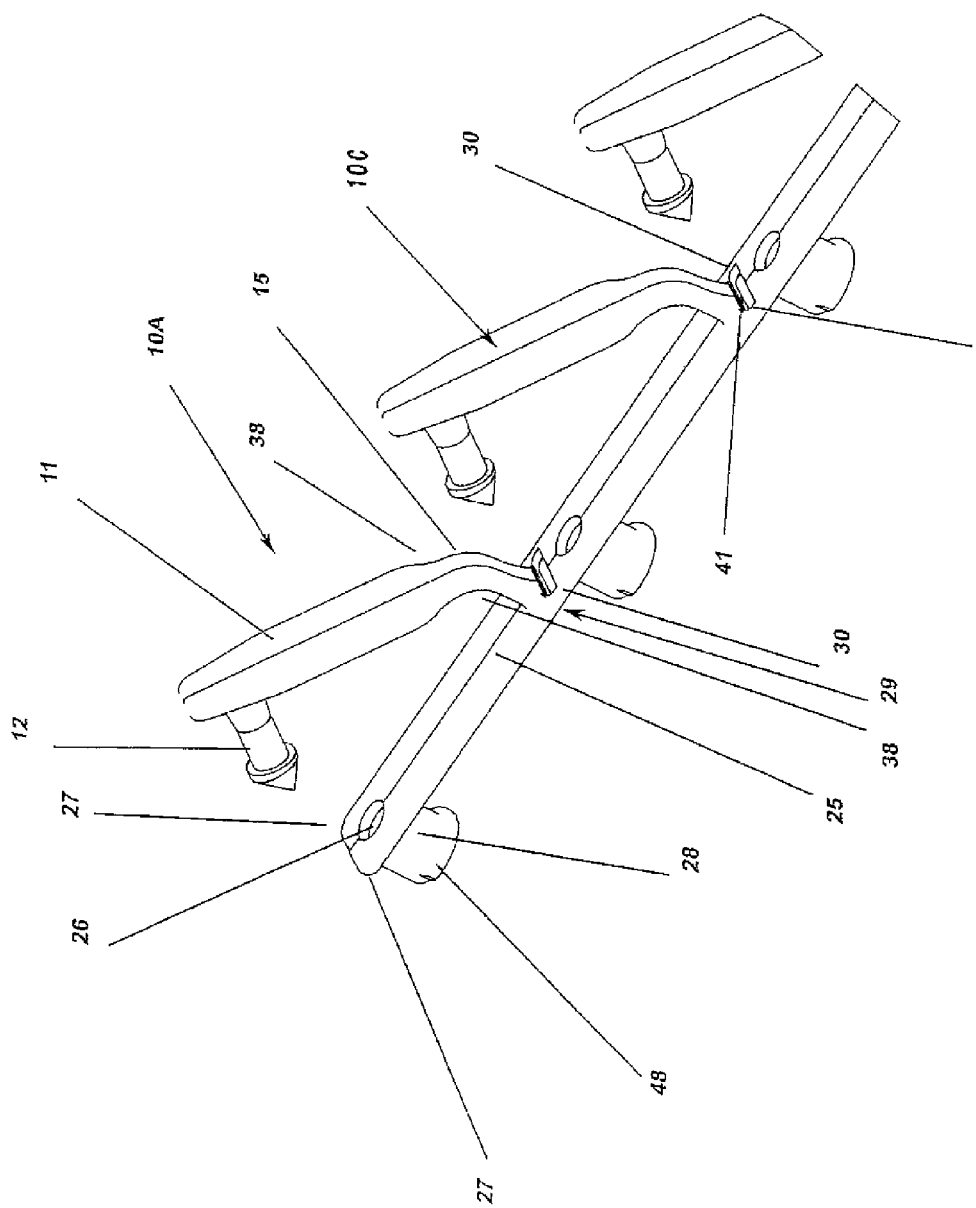
FIG. 13: Shows a plan perspective view of two tags of a strip.

The tags 10 of the strip, see FIG. 13, may suitably incorporate a male portion 11 with a spike 12 and a tip 12A and a female portion 25 with an apertured boss 28 with aperture 26. The male portion 11 is facing towards the female portion 25 so that for their subsequent engagement a preliminary folding operation is not required. The male and female portions 11, 25 and adjacent tags 10 of the strip may be suitably interconnected together by means respectively of upper and lower connecting portions 15, 29. The upper connecting portion 15 will be at least partially flexible to facilitate the further folding over of the male portion 11. The lower connecting portion 29 may include a frangible or weakened section to facilitate the separation of the tags 10 from the strip as and when required. The lower connecting portion 29 is shown with a transverse slot 41 between two side portions 30, so that in separating the adjacent tags 10 it is only necessary to sever the portions 30. As shown particularly in FIG. 13 for example, the upper connecting portion 15 may include cut-away portions 38 to facilitate movement of the tags 10 into the dispensing position especially in moving past the cutting means 31.

Referring particularly to FIGS. 3, 12, 14 and 17 the jaws 6 and 7 are shown in their open position between which jaws a front-most tag 10A is shown positioned, ready to be dispensed and secured about part of an animal. In this position the handle 3 is biased open relative to the handle 2. A suitable biasing means such as a spring 22 biases the handle 3 into this jaw-open position shown in FIGS. 3, 12, 14 and 17. The spring 22 is also in this jaw-open position, biasing a strip transporting or moving means, such as a pusher 18 at the end of slider 17, against the rear of the boss 28 of the front-most tag 10A, see especially FIG. 17.

Figure 14:
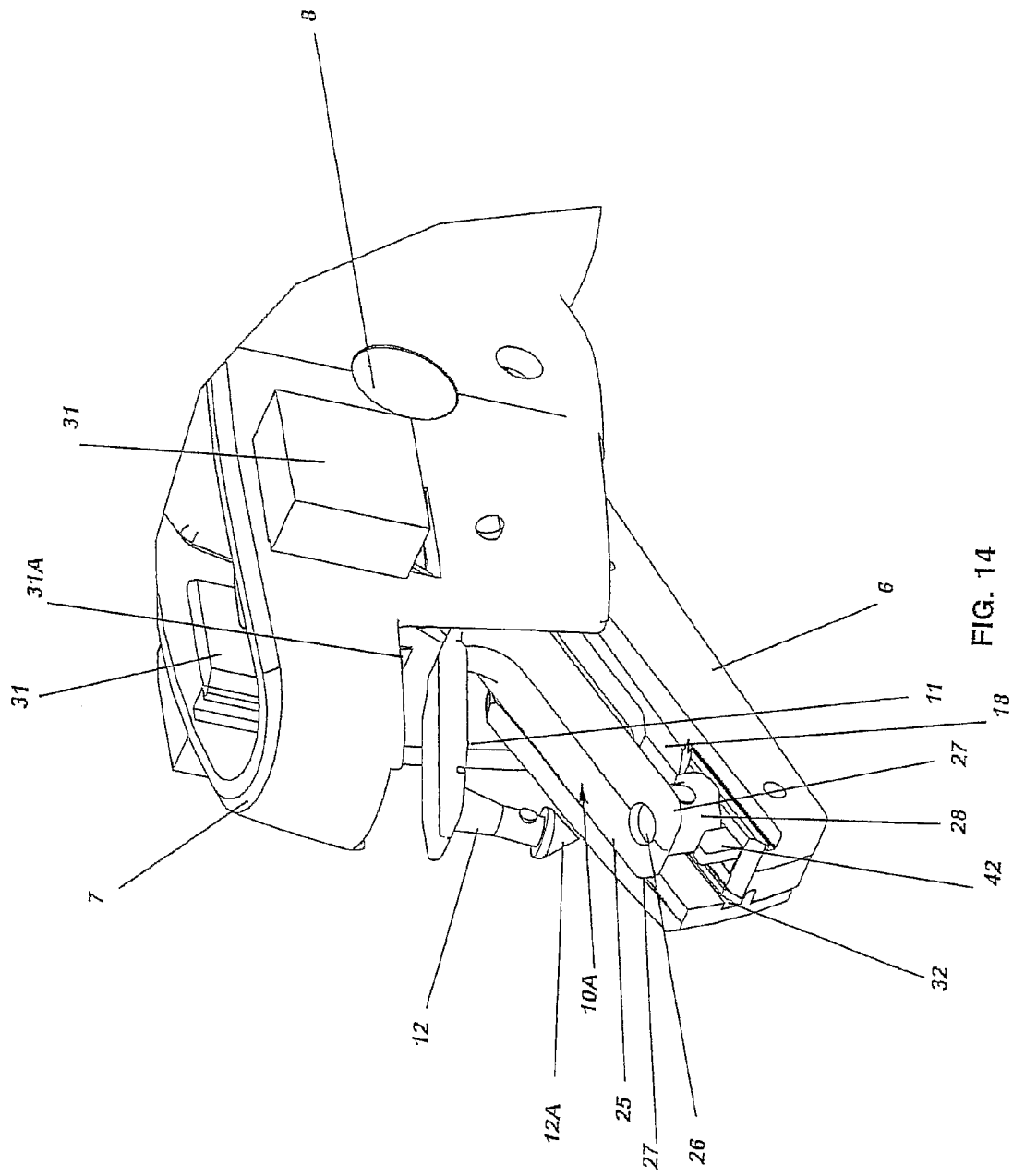
FIG. 14: Shows a front perspective view of the applicator with a loaded tag.
Figure 15:
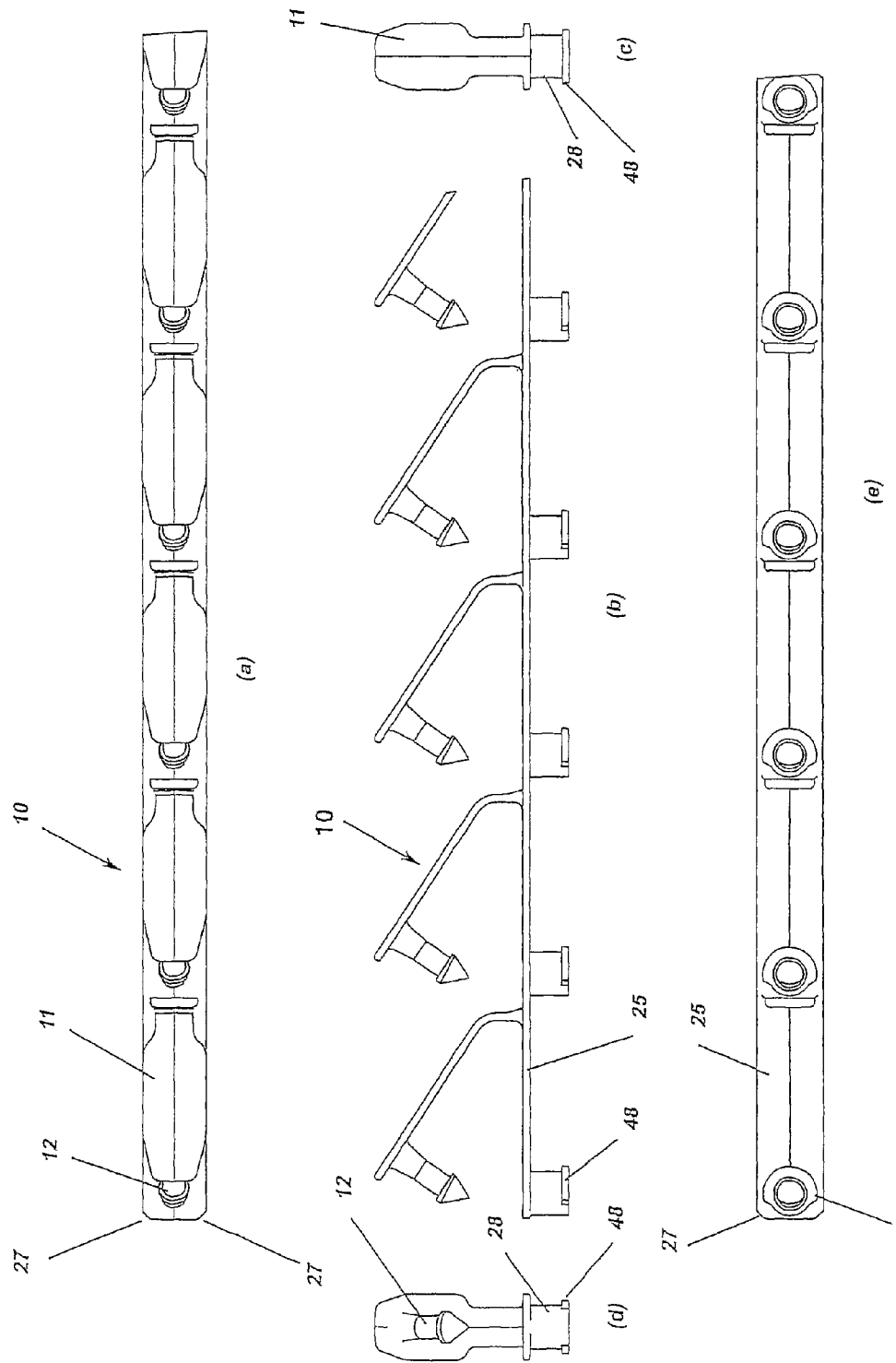
FIGS. 15(*a*), (*b*), (*c*) (*d*) and (*e*): Show respectively, plan, side, rear, front and underneath views of a strip of tags according to one possible embodiment of the invention.
Figure 16:
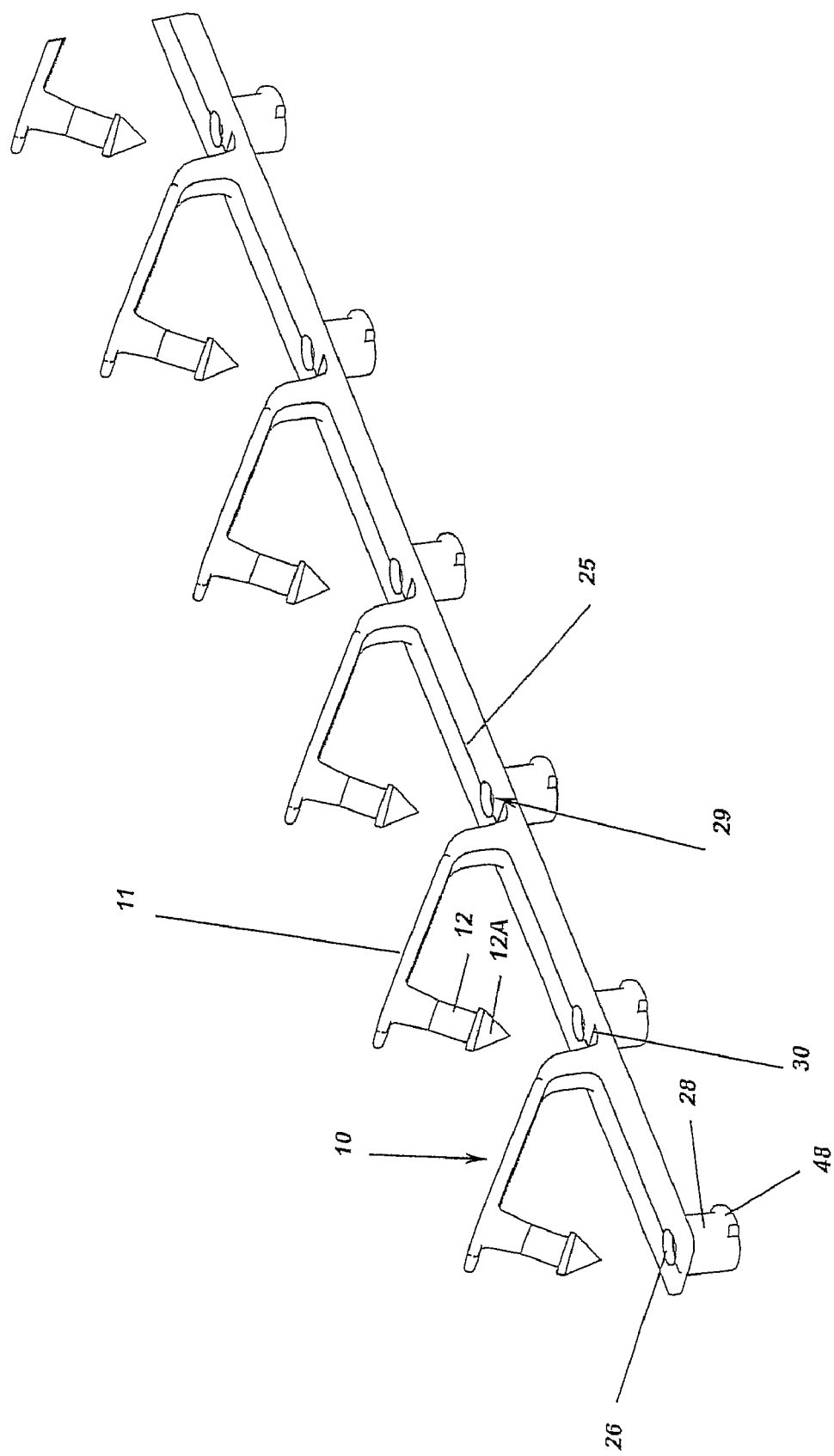
FIG. 16: Shows a side perspective view of a strip of tags.
Figure 17:
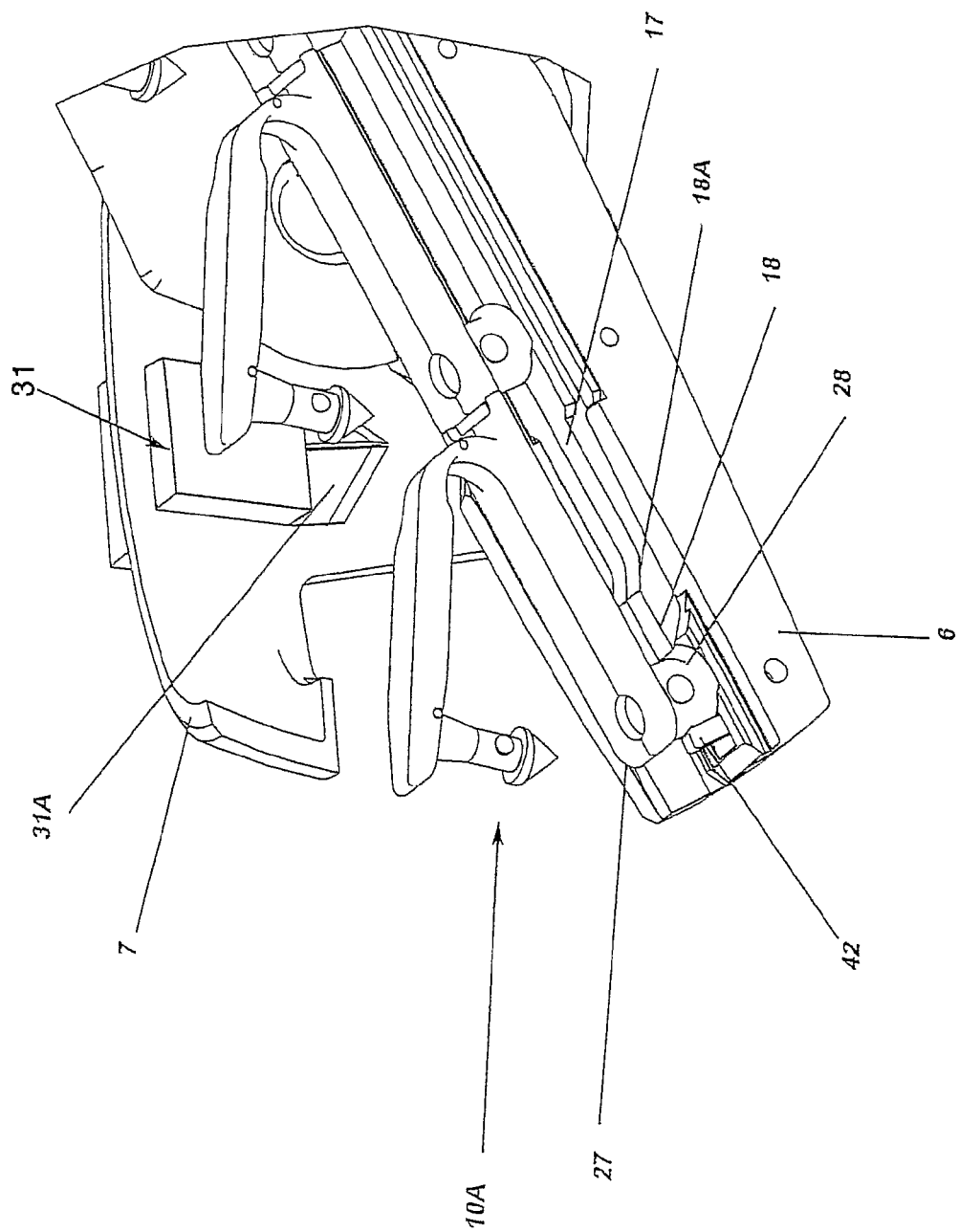
FIG. 17: Shows a cut-away front perspective view of the applicator with a loaded tag and with the blade assembly shown in more detail.

In this jaw-open position, see particularly FIGS. 14 and 17, an upstanding stop peg or abutment 42 on the bottom jaw 6 will also engage the front of the boss 28 of the front-most tag 10A.

Figure 8:
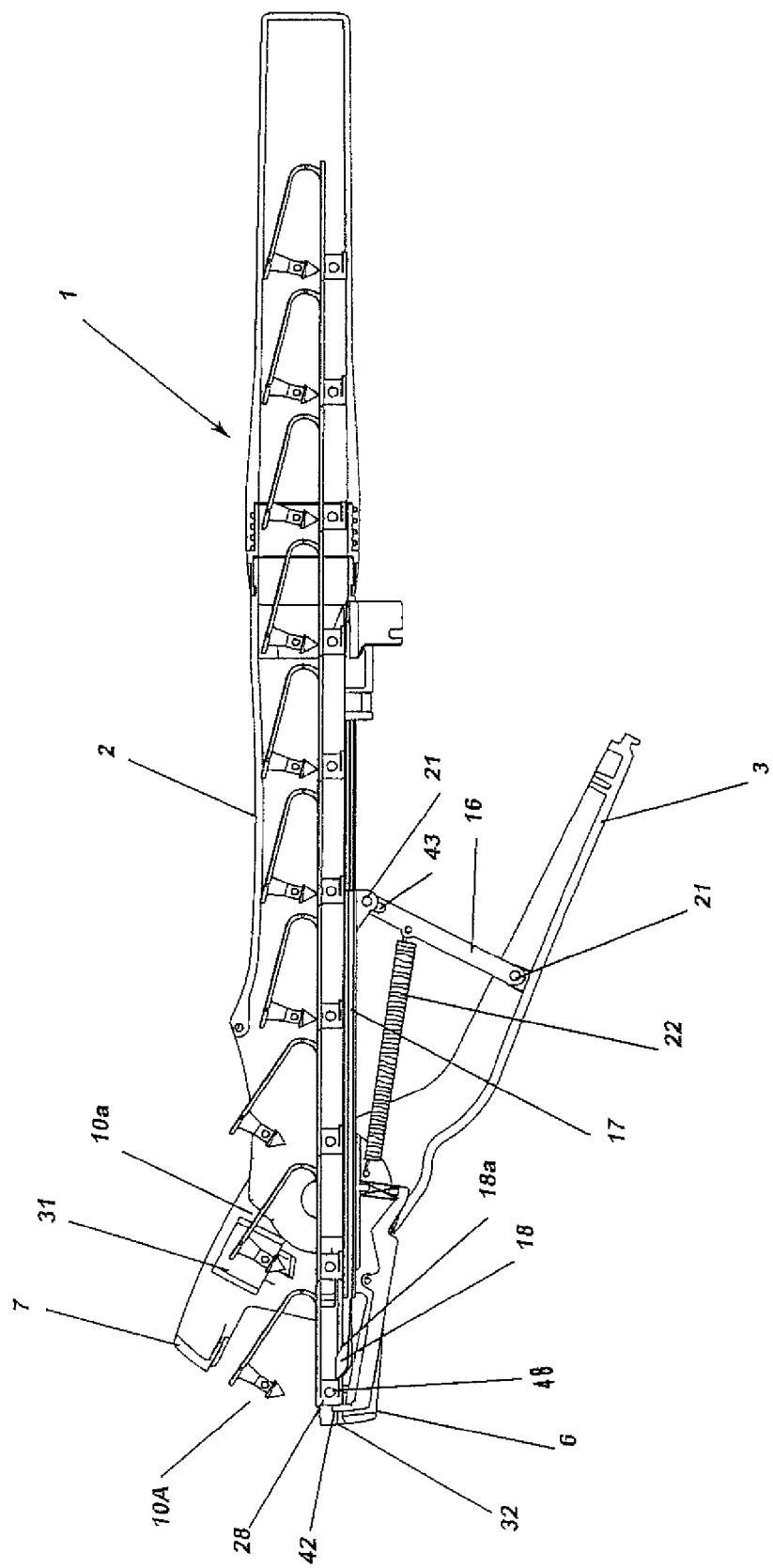
FIG. 8: Shows in part cross-section the ear tag applicator of FIG. 7 with the front-most tag moved forward into its position for dispensing by the opening of the handles.
Figure 11:
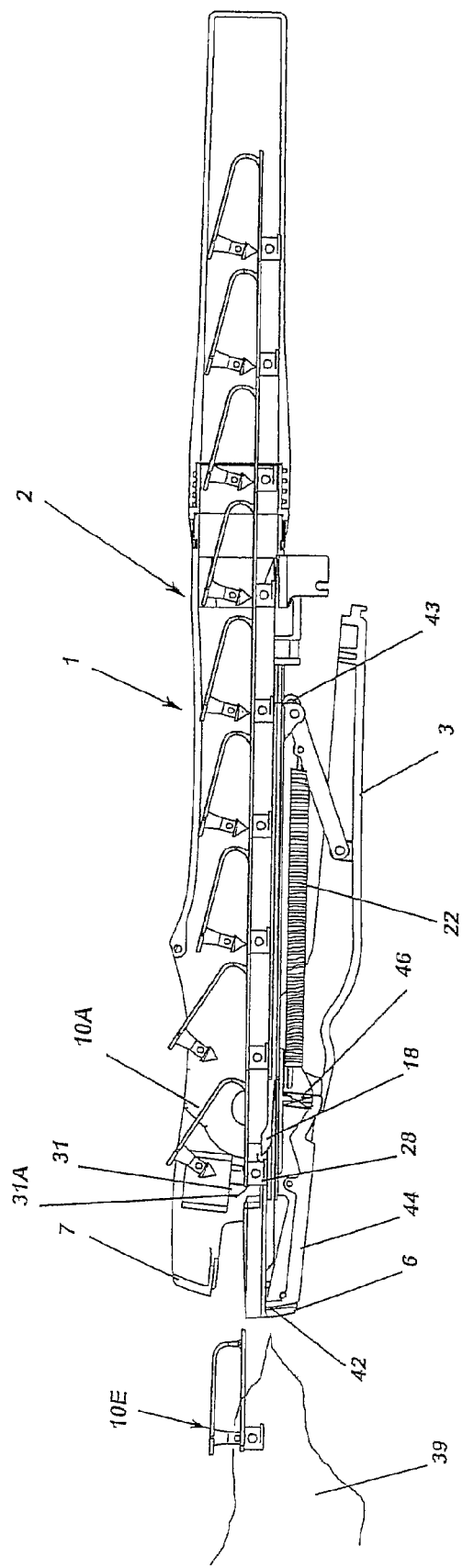
FIG. 11: Shows the front-most tag after release; with the animal's ear shown in outline.

Referring particularly to FIG. 8, it is seen that the handle 3 is connected to the slider 17 by means of pivots 21 and arm 16. The slider 17 is adapted to slide, suitably in a guide or the like, on the underside of the handle 2. The pusher member or the like 18 is shown having an angled rear face 18A to facilitate its return past the following tag 10 as the applicator is opened. As indicated in FIG. 11, a lost motion slot 43 delays the slider 17 and pusher 18 returning along the handle 2, and engaging behind the next following tag after the dispensing of the front-most tag 10A, and the opening of the handles 2, 3, until the blade assembly 1 has been raised.

It will be appreciated therefore that the strip of tags 10 of the present invention is moved in a single longitudinal direction after the front-most tags have been separated from the strip and tagged to the animal, thus avoiding the problems associated with the lateral or sideways feed into the applicator body of earlier applicators. By pushing behind the front-most tag the rest of the strip of tags is in effect pulled through the applicator body. Also the strip of tags 10 is moved in its entirety through the applicator body so avoiding any premature separation of the individual tags from the tag strip. Additionally there is no wastage in that all the tags of the strip can be used.

Once a strip of tags has been loaded into the applicator 1 of the present invention, it can then be automatically used for sequential tagging operations until all the tags have been used up, and when a relatively simple re-loading operation can be effected.

Figure 6:
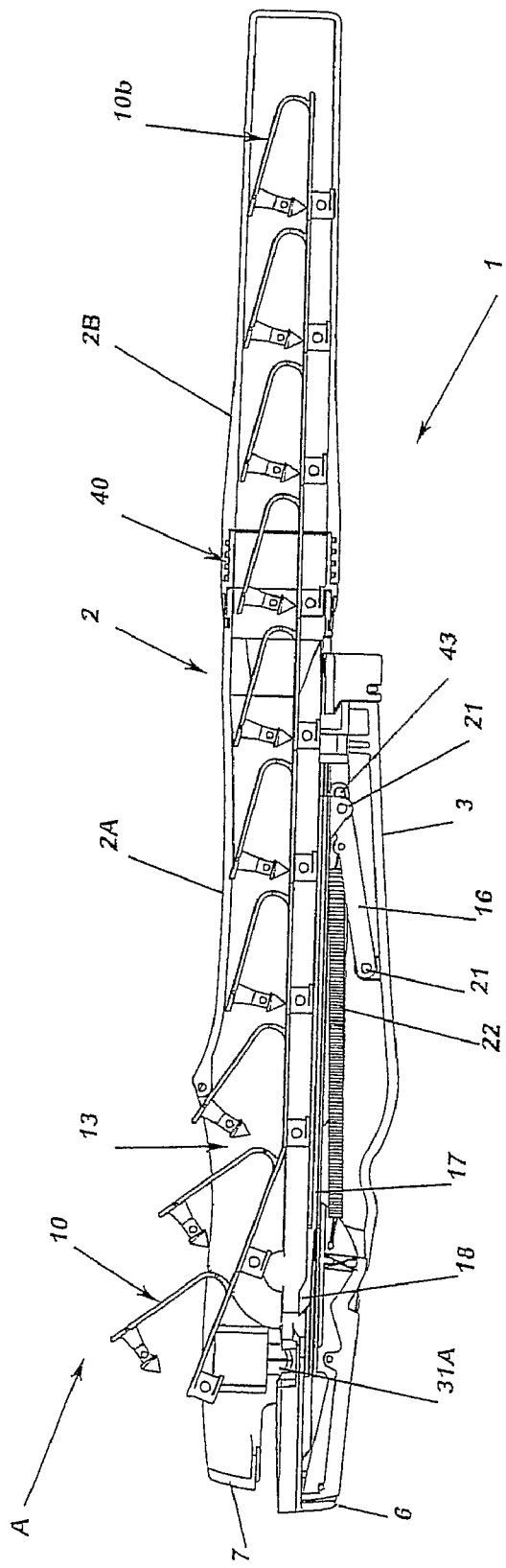
FIG. 6: Shows in part cross-section the applicator of the preceding figures being loaded with a strip of tags.
Figure 7:
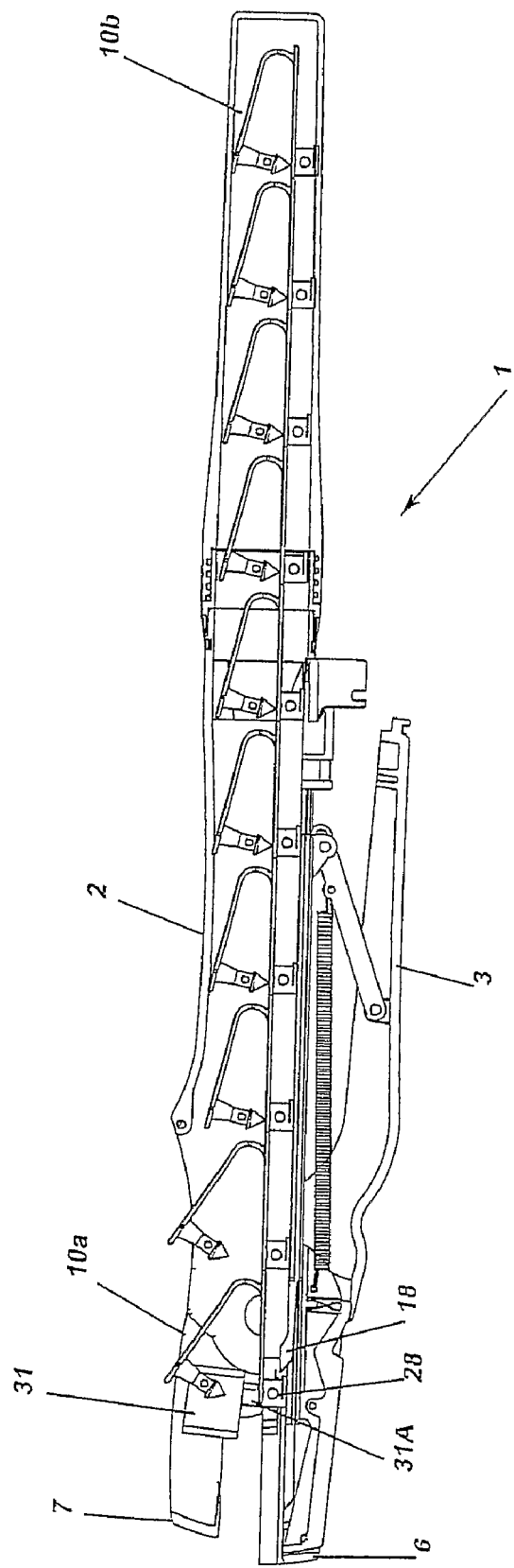
FIG. 7: Shows in part cross-section the ear tag applicator of FIG. 6 after loading.

Referring particularly, to FIGS. 1-5, 12, 14, and 17 an applicator 1 loaded with a strip of tags is shown ready for a tagging operation with the front-most tag 10A positioned between the jaws 6 and 7 and with the handles 2 and 3 spaced apart in their open position. In loading the strip of tags 10 into the tagger 1, tags 10 are fed in the direction of arrow A, in this embodiment, into top opening 13 in the handle 2 so that they are then pushed along, within the two parts 2A and 2B of the handle 2, while the tagger 1 is in its closed position, as shown in FIG. 6. As also seen in FIG. 6, during this loading position the pusher 18 at the end of slider 17 is in its rearward position with the return spring 22 extended. The blade or cutter assembly 31 is also shown in its lowered cutting position. In FIG. 7 the strip of tags 10 is shown in its loaded position with the lead tag 10a, with its boss 28, in front of the pusher 18 but behind the cutter assembly 31. Depending on the initial length of the strip of tags 10 and the length of compartment defined by the elongated handle 2, the rearward tags 10b of the strip may be slightly compressed longitudinally. This can assist to restrict the movement of the whole strip i.e. this tending to ensure stability of the strip of tags within the applicator. In this regard it is to be appreciated that the tagger could be used perhaps inverted in use, not in the upright position shown. Each of the bosses 28 of the female portions 25 of each tag 10 are also shown including a flange or the like 48 which can engage in a T-slot 32 (see FIG. 14) on either side of the lower jaw portion 6, so as to stabilise the positioning of the tags 10 in the applicator.

Figure 9:
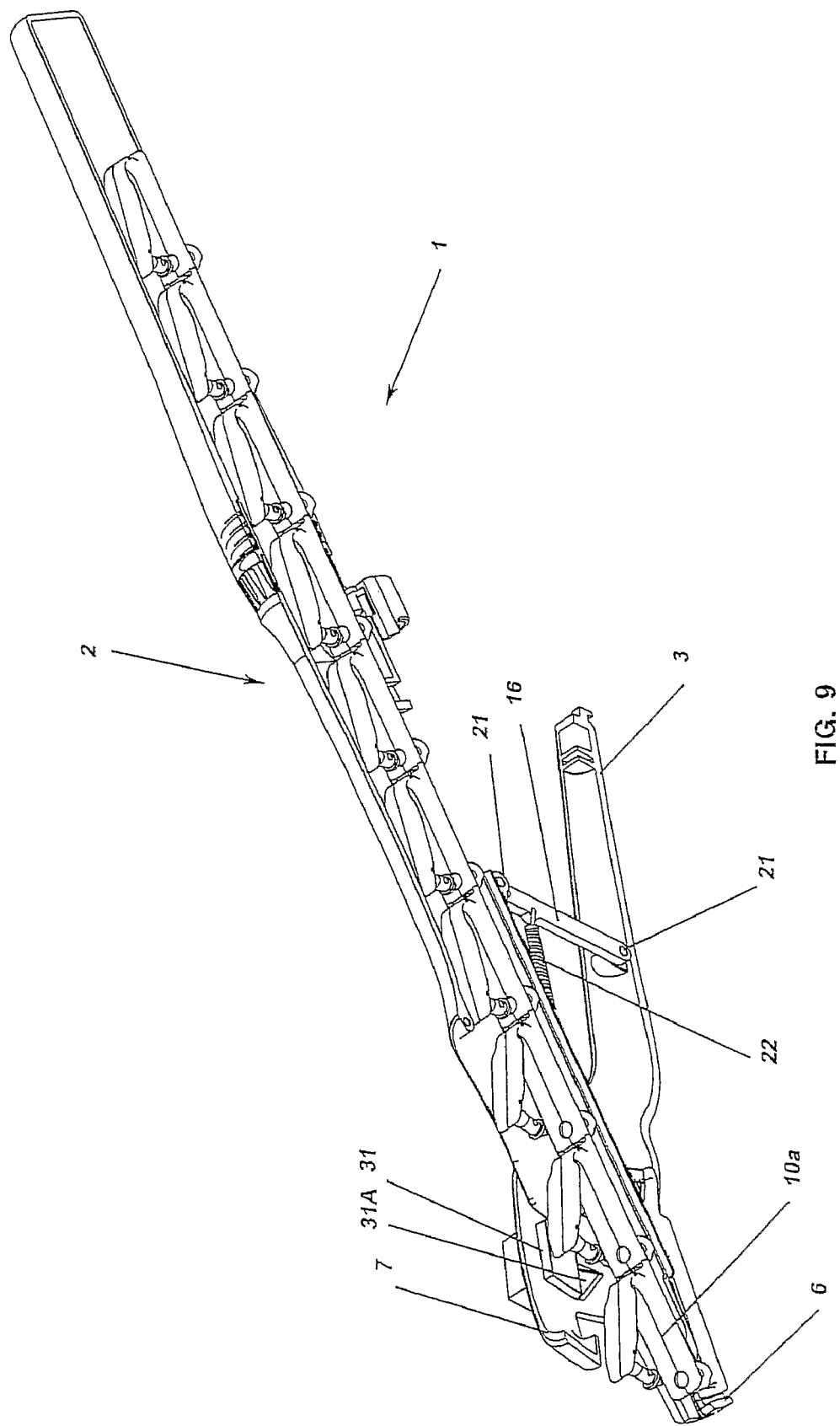
FIG. 9: Shows a perspective plan view of FIG. 8.

Referring then to FIGS. 8 and 9 particularly, as the handles 2 and 3 are opened the flange 48 of the front-most tag 10A will engage in the T-slots 32 and the pusher 18 will be acting on the boss 28 of that front-most tag 10A moving it forward towards the primed position. It will be appreciated in this regard that the pusher return spring 22, as well as acting on the pusher 18, is also acting to open the tagger 1 into the position shown in FIGS. 8 and 9.

Figure 10:
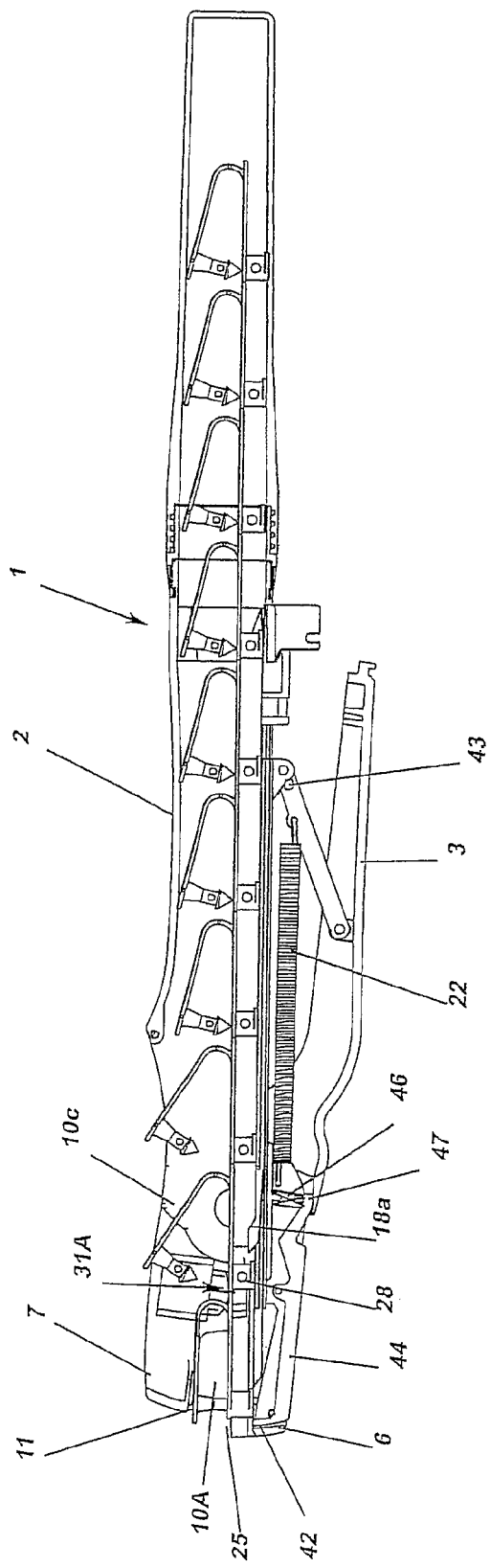
FIG. 10: Shows the front-most tag applied (the animal's ear not being shown)

Referring then to FIG. 10, the front-most tag 10A has now been applied to the animal's ear (the ear not being shown) and the cutting means 31 has separated the front-most tag 10A from the following tag 10C. It will be appreciated that the top jaw 7 is only required to force the male portion 11 of the tag 10A further towards its engagement with the female portion 25. This contrasts with previous tag strips such as these of Cohr and Eadie where the tags require a folding-over operation to enable engagement of their male and female portions.

Referring then to FIG. 11 with the stop 42 in the down position, the applied tag 10E has now been released with the animal's ear 39 (and it is mentioned in this regard that after the tag has been applied, it can be pulled free by the animal in that there is no hindrance to this being achieved). It is seen that with the jaws 6 and 7 still closed the pusher 18 is now located behind the boss 28 of the new front-most tag 10A in pushing that tag and its connected strip of tags forward.

The lost motion slot 43 enables the rearward movement of the pusher 18 into position behind the next tag 10. This is achieved by the lost motion preventing the slider 17 from moving forward as the tagger 1 is opened, after applying the tag 10A. This allows the blades 31A to clear the front edge of the next tag 10 before that tag moves forward to the front position in the jaws 6, 7. The delay or dwell is only for a short time before the pusher 17 takes up the "slack". This avoids the blades 31A from preventing the next tag 10 from moving if the slider 7 was to move immediately, causing a jam.

Figure 12:
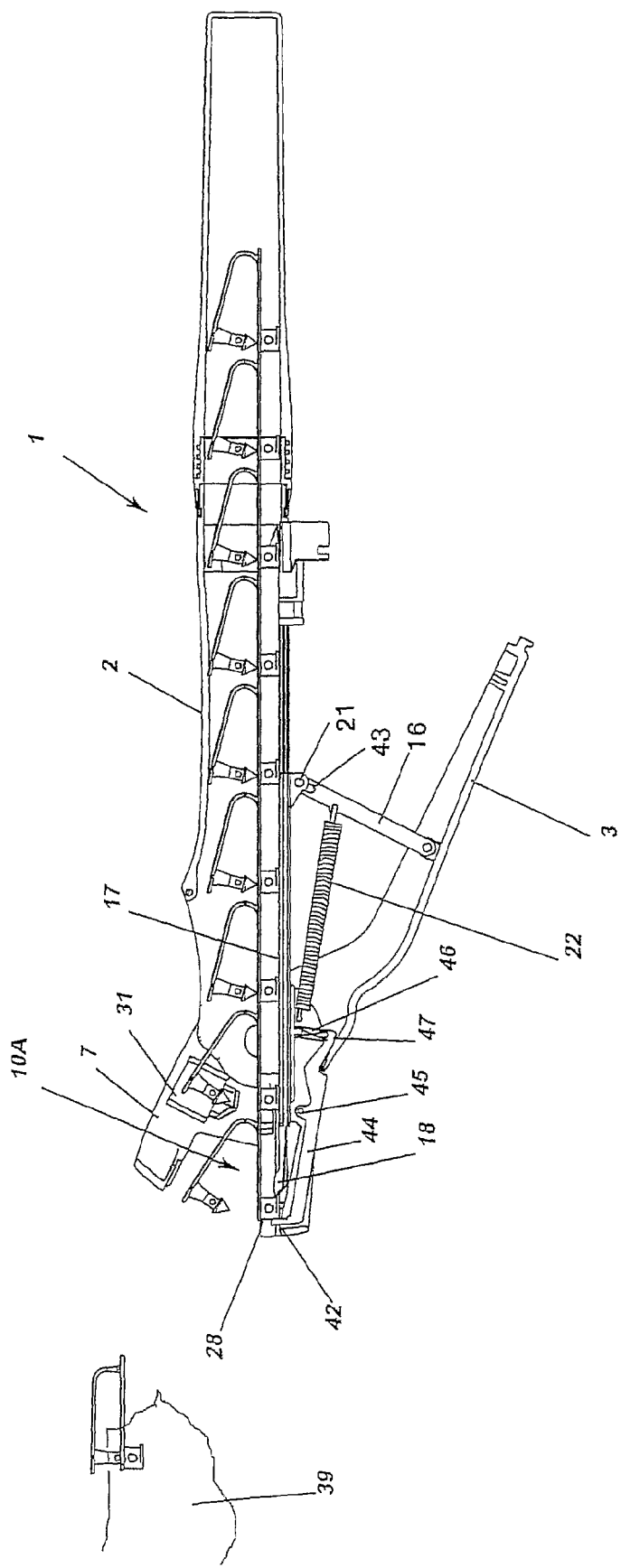
FIG. 12: Shows the applicator re-loaded, with the front-most tag fully forward.

Then turning to FIG. 12, the applicator 1 is shown in its re-loaded position with the new front-most tag 10A in its primed position. In reaching the primed position shown in FIG. 12, the new front-most tag 10A must move past the cutting means 31. To assist this movement, as seen particularly in FIG. 13, the tags 10 may include side cut-away portions 38, the timing of movement of operation being such that the cut-away portions 38 will be in the area of the cutting means 31 as the new front-most tag 10A moves therepast. The provision of the cut-away portions 38 may also be of benefit in facilitating the folding over of the tags 10 so that they may achieve an essentially parallel relationship between the male and female portions.

Referring particularly to FIG. 14, a primed tag 10 is shown in greater detail in position between the jaws 6 and 7. The female portion 25 is shown with its aperture 26 ready to receive the tip 12A of stem 12 of the male portion 11. It is also seen that the top front edges 27 of the female portion 25 are tapered or chamfered so as to avoid damage to the animal's ear close to the stem 12. In this regard any proud or irregular surfaces can damage an animal's ear as the tag rotates, which can have serious consequences. It is however important to ensure that the tapered and clean surfaces 27 are preserved in this embodiment when the tags 10 are separated from each other and from the strip. Accordingly, as will be appreciated from FIGS. 13-16 particularly, the cutting means 31 are required to ensure an acceptable separation of the tags, so that the connecting portion 29 between adjacent tags will provide, in this preferred embodiment, the chamfered front edges 27 and chamfered rear edges with the removal of residual portions 27A on the rear of the front-most tag. The cutting means 31 are therefore positioned to act behind the forward tag and the chamfered front edges 27 are achieved by the chamfer cutting blades 31A.

Referring particularly to FIGS. 12, 14 and 17 a stop or abutment 42 is shown provided at the front end of the jaw 6 to act as an abutment for the boss 28 of the front tag 10A. As seen particularly in FIG. 12, the stop 42 may suitably be an upwardly directed end portion of an elongate arm 44 pivoted at 45 and biased by means of spring 46 into the "up" position of the stop 42. When the front tag 10A is to be released on the animal's ear 39, as shown in particularly in FIGS. 10 and 18, the lower handle 3, as the handles 2 and 3 are squeezed together, will engage the end 47 of arm 44, depressing the spring 46, so that the stop member 42 is pivoted downwardly, thus disengaging from the boss member 28 of the front tag 10A and allowing its release.

Figure 18:
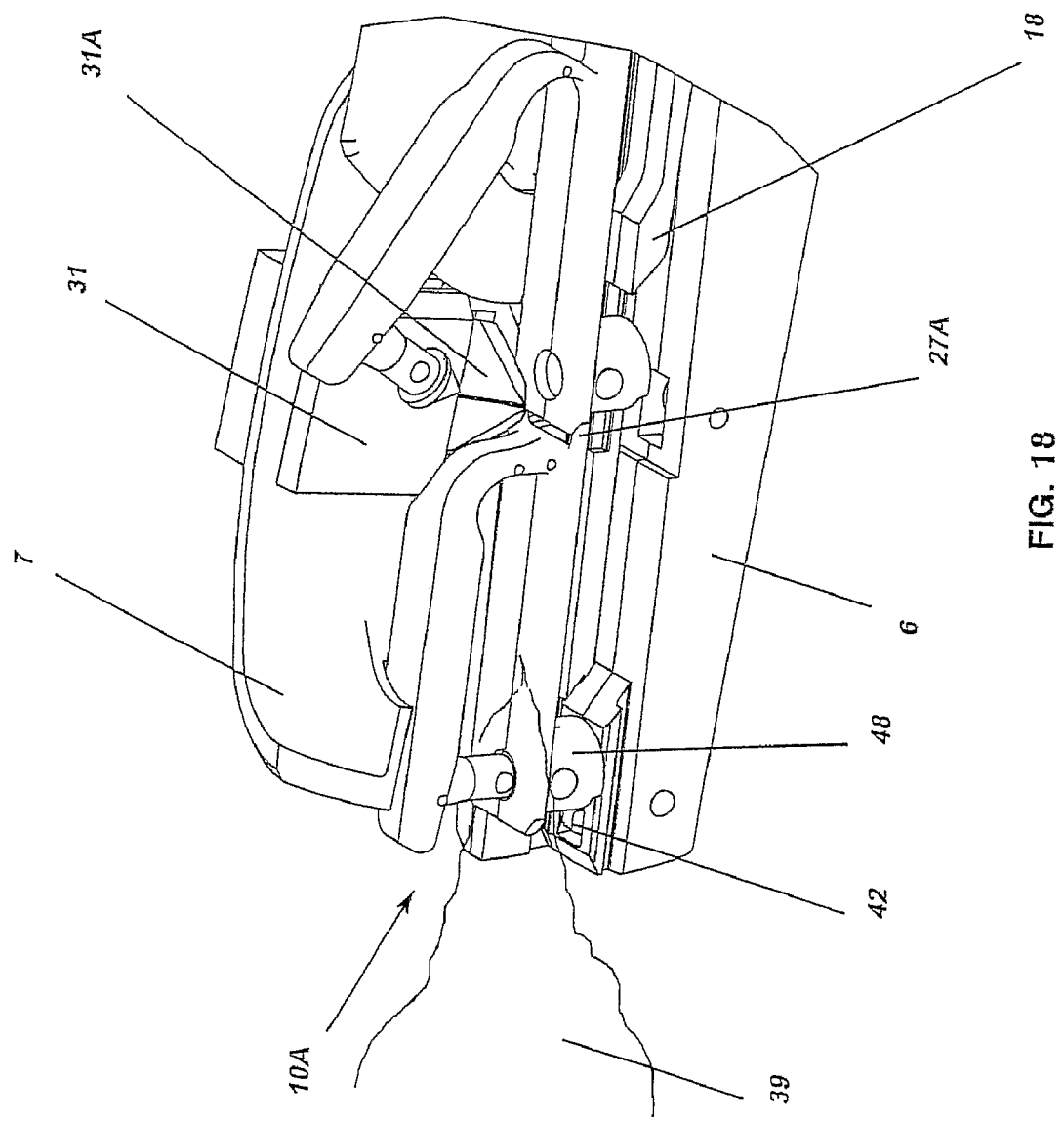
FIG. 18: Shows FIG. 17 after operation of the applicator.

Referring particularly to FIGS. 17 and 18, a blade assembly 31 is shown provided on each side of the upper jaw 7. Suitably, as shown, the blade assembly 31 includes a V or notch blade assembly to enable the cutting of a chamfer on both sides on the rear edge of the leading tag 10A and both sides of the front edge of the next tag 10 so that when that next tag 10 becomes the front-most tag 10A, it will present a pair of chamfered edges 27 (see FIG. 17).

It is seen therefore that the tagger and tag strip of the present invention may provide speedy and effective sequential tagging operations for a number of animals without reloading.

Where in the foregoing description, reference has been made to specific components or integers of the invention having known equivalents, then such equivalents are herein incorporated as if individually set forth. Also where reference in the specification, has been made to "ear tag", it is to be understood that this encompasses tags and applicators therefor which may be suitable for application to any part of an animal's body.

Although this invention has been described by way of example and with reference to possible embodiments thereof, it is to be understood that modifications or improvements may be made thereto without departing from the scope of the invention as defined in the appended claims.

The invention claimed is:

1. An animal tag applicator including an applicator body having a longitudinal axis and adapted to longitudinally receive therein a strip of longitudinally directed and longitudinally connected tags, each tag having a male portion and a female portion both of which extend in a longitudinal direction of the strip, transporting means provided for the applicator body and adapted in use to engage with the said strip of tags, so that in use the strip is moved substantially longitudinally relative to the applicator body to position a front-most tag of the strip at a dispensing position, said applicator body further including a dispensing means adapted to engage in use, with said front-most tag so that it is separated from a next adjacent tag in the strip at said dispensing position to be secured about part of an animal, said transporting means being adapted to then be re-engageable with said strip to move a next front-most tag to said dispensing position and wherein the transporting means is adapted to engage a portion of the front-most tag in pulling the strip longitudinally relative to the applicator body, said applicator body being provided as part of a first handle extending to a first jaw portion provided at its front end, a second handle pivotally connected with said first handle and extending at its front end to a second jaw portion, the pivoting of the first and second handles together closing the first and second jaw portions together for a front-most tag to be dispensed and wherein the first and second handles and said first and second jaw portions are normally biased into an open position, said transporting means being biased towards a front end of the first jaw portion to engage the front-most tag of the strip and bias it towards the dispensing position.

2. An animal tag applicator as claimed in claim 1 wherein each tag includes a boss portion and said transporting means includes a sliding means able to slide along the applicator body and a front end of which engages, in use, with the boss portion of the front-most tag.

3. An animal tag applicator as claimed in claim 1 or claim 2 in which the male portion of each tag of said strip is flexibly interconnected with, and facing towards, the female portion, the engagement of the dispensing means with the front-most tag resulting in the engagement of the male portion with the female portion and the separation of the front-most tag from the next adjacent tag.

4. An animal tag applicator as claimed in claim 3 in which the dispensing means includes said second jaw portion, which is adapted to engage with an upper surface of the male portion of the front-most tag, and said dispensing means further including a cutting means adapted to engage in a cutting position with a connecting portion between the front-most tag and a next adjacent tag.

5. An animal tag applicator as claimed in claim 4 in which a said cutting means is provided on each side of the second jaw portion to cuttingly engage in use, a respective side of the connecting portion.

6. An animal tag applicator as claimed in claim 5 in which each said cutting means includes a blade adapted to cut, in the connecting portion, a chamfer on a front edge of the next adjacent tag.

7. An animal tag applicator as claimed in claim 4 in which a lost motion connection is provided between the second handle and the transporting means to delay the movement of the transporting means to engage the next tag after the front-most tag has been dispensed until the cutting means has been moved from said cutting position.

8. An animal tag applicator as claimed in claim 7 in which the lost motion connection includes an elongate slot provided in a linkage connecting the transporting means with the second handle.

9. An animal tag applicator as claimed in claim 1 in which the first jaw portion includes a stop means adapted to engage with the front-most tag at said dispensing position, said stop means being movable to a release position when the front-most tag is to be dispensed.

10. An animal tag applicator as claimed in claim 9 in which the stop means is normally biased into its stop position, the movement of the handles together in closing the first and second jaw portions acting against the bias in moving the stop means to its release position.

11. An animal tag applicator as claimed in claim 1 in which the second jaw portion is adapted to receive and accommodate the female portion of the front-most tag, said second jaw portion including a slot provided on each side thereof adapted to slideably receive therein a side projection provided for said female portion.

* * * * *